United States Patent
Lüthi et al.

(10) Patent No.: US 9,766,326 B2
(45) Date of Patent: Sep. 19, 2017

(54) LASER TRACKER WITH CALIBRATION UNIT FOR SELF-CALIBRATION

(71) Applicant: LEICA GEOSYSTEMS AG, Heerbrugg (CH)

(72) Inventors: Thomas Lüthi, Aarau (CH); Manfred Küpfer, Waldshut-Tiengen (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 347 days.

(21) Appl. No.: 14/415,556

(22) PCT Filed: Jul. 12, 2013

(86) PCT No.: PCT/EP2013/064841
§ 371 (c)(1),
(2) Date: Jan. 16, 2015

(87) PCT Pub. No.: WO2014/012864
PCT Pub. Date: Jan. 23, 2014

(65) Prior Publication Data
US 2015/0226841 A1    Aug. 13, 2015

(30) Foreign Application Priority Data

Jul. 19, 2012 (EP) .................................... 12177021

(51) Int. Cl.
*G01C 3/08* (2006.01)
*G01S 7/497* (2006.01)
(Continued)

(52) U.S. Cl.
CPC ............ *G01S 7/497* (2013.01); *G01S 7/4813* (2013.01); *G01S 17/42* (2013.01); *G01S 17/66* (2013.01)

(58) Field of Classification Search
CPC ........ G01S 17/66; G01S 17/42; G01S 7/4813; G01S 7/497
(Continued)

(56) References Cited

U.S. PATENT DOCUMENTS 4,569,591 A * 2/1986 Ford ..................... G01S 7/4811
                                                356/153
5,831,719 A * 11/1998 Berg ...................... G01B 11/00
                                                356/141.1
(Continued)

FOREIGN PATENT DOCUMENTS

EP    0 082 598 A1   6/1983
EP    0 553 266 B1   5/1997
(Continued)

OTHER PUBLICATIONS

European Search Report dated Oct. 30, 2012 as received in Application No. 12 17 7021.

*Primary Examiner* — Mark Hellner
(74) *Attorney, Agent, or Firm* — Maschoff Brennan

(57) ABSTRACT

Embodiments of the invention relate to a laser tracker for continuous tracking of a target, with a beam source for generating measuring radiation, a base defining a vertical axis and a support, wherein the support is pivotable by motor power about the vertical axis relative to the base and thereby a horizontal pivot angle is defined. The tracker further comprises a beam directing unit pivotable by motor power, which defines a vertical pivot angle for orienting the measuring radiation and for receiving measuring radiation, an angle measuring functionality for determining the horizontal pivot angle and the vertical pivot angle, a distance measuring functionality and a photosensitive surface detector for detecting an incidence position of the reflected measuring radiation. The base has a self-calibration unit with a first (Continued)

retroreflective reference target and an optical assembly functioning as a reducing lens.

21 Claims, 6 Drawing Sheets

(51) Int. Cl.
    *G01S 17/66*     (2006.01)
    *G01S 7/481*     (2006.01)
    *G01S 17/42*     (2006.01)

(58) Field of Classification Search
    USPC .................................................. 356/5.01
    See application file for complete search history.

(56) References Cited

U.S. PATENT DOCUMENTS

| | | |
|---|---|---|
| 7,327,446 B2 | 2/2008 | Cramer et al. |
| 8,772,719 B2 | 7/2014 | Bockem et al. |
| 2004/0136012 A1* | 7/2004 | Kyle ............... G01S 5/163 356/614 |
| 2015/0160039 A1* | 6/2015 | Grasser ............ G01C 25/00 73/1.75 |

FOREIGN PATENT DOCUMENTS

| | | |
|---|---|---|
| WO | 2005/026772 A2 | 3/2005 |
| WO | 2007/079600 A1 | 7/2007 |
| WO | 2010/148525 A1 | 12/2010 |

* cited by examiner

LASER TRACKER WITH CALIBRATION UNIT FOR SELF-CALIBRATION

FIELD OF THE INVENTION

The invention relates to a laser tracker for the progressive tracking of a target, a calibration method for determining at least one calibration parameter for a laser tracker, and a computer program product.

BACKGROUND

Measuring devices which are implemented for progressive tracking of a target point and a coordinate position determination of this point can generally, in particular in conjunction with industrial surveying, be summarized under the term laser trackers. A target point can be represented in this case by a retroreflective unit (for example, a cube prism), which is targeted using an optical measurement beam of the measuring device, in particular a laser beam. The laser beam is reflected in parallel back to the measuring device, wherein the reflected beam is detected using a detection unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the detection of the beam, for example, by means of runtime or phase difference measurement.

Laser trackers according to the prior art can additionally be embodied having an optical image detection unit having a two-dimensional, light-sensitive array, for example, a CCD or CID camera or a camera based on a CMOS array, or having a pixel array sensor and having an image processing unit. The laser tracker and the camera can be installed one on top of another in this case in particular in such a manner that the positions thereof in relation to one another are not variable. The camera is, for example, rotatable together with the laser tracker about its essentially perpendicular axis, but is pivotable up-and-down independently of the laser tracker and is therefore arranged separately from the optic of the laser beam in particular. Furthermore, the camera—for example, as a function of the respective application—can be embodied as pivotable about only one axis. In alternative embodiments, the camera can be installed in an integrated construction together with the laser optic in a shared housing.

With the detection and analysis of an image—by means of image detection and image processing unit—of a so-called measuring aid instrument having markings, the relative locations of which to one another are known, an orientation of the instrument and of an object (for example, a probe), which is arranged on the measuring aid instrument, in space can be concluded. Together with the determined spatial position of the target point, furthermore the position and orientation of the object in space can be precisely determined absolutely and/or in relation to the laser tracker.

Such measuring aid instruments can be embodied by so-called scanning tools, which are positioned having the contact point thereof on a point of the target object. The scanning tool has markings, for example, light spots, and a reflector, which represents a target point on the scanning tool and can be targeted using the laser beam of the tracker, wherein the positions of the markings and the reflector in relation to the contact point of the scanning tool are precisely known. The measuring aid instrument can also be, in a way known to a person skilled in the art, a handheld scanner equipped for distance measurement, for example, for contactless surface surveying, wherein the direction and position of the scanner measurement beam used for the distance measurement are precisely known in relation to the light spots and reflectors which are arranged on the scanner. Such a scanner is described, for example, in EP 0 553 266.

In addition, in modern tracker systems, a deviation of the received measurement beam from a so-called servo-monitoring point is ascertained on a sensor—increasingly as a standard feature. By means of this measurable deviation, a position difference between the center of a retroreflector and the point of incidence of the laser beam on the reflector can be determined and the alignment of the laser beam can be corrected or tracked as a function of this deviation such that the deviation on the sensor is decreased, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the measuring device. The tracking can be implemented in this case, for example, by means of an alignment change of the deflection mirror, which is movable by a motor and provided for deflecting the laser beam, and/or by a pivot of the targeting unit, which has the beam-guiding laser optic.

The described target tracking must be preceded by locking of the laser beam on the reflector. For this purpose, a detection unit having a position-sensitive sensor and having a comparatively large field of vision can also be arranged on the tracker. Moreover, in devices of the type in question, additional illumination means are integrated, using which the target or the reflector is illuminated, in particular using a defined wavelength differing from the wavelength of the distance measuring means. The sensor can be implemented in this context to be sensitive to a range around this specific wavelength, for example, to reduce or entirely prevent external light influences. By means of the illumination means, the target can be illuminated and, using the camera, an image of the target having illuminated reflector can be detected. By way of the imaging of the specific (wavelength-specific) reflection on the sensor, the reflection position in the image can be resolved and therefore an angle in relation to the detection direction of the camera and a direction to the target or reflector can be determined. An embodiment of a laser tracker having such a target search unit is known, for example, from WO 2010/148525 A1. In dependence on the direction information thus derivable, the alignment of the measurement laser beam can be changed such that a distance between the laser beam and the reflector, onto which the laser beam is to be locked, is decreased.

Laser trackers of the prior art have at least one distance meter for distance measurement, wherein it can be implemented as an interferometer, for example. Since such distance measuring units can only measure relative distance changes, so-called absolute distance meters are installed in addition to interferometers in current laser trackers. For example, such a combination of measuring means for distance determination is known by way of the product AT901 of Leica Geosystems AG. The interferometers used in this context for distance measurement primarily use gas lasers—as a result of the long coherence length and the measurement range thus made possible—as light sources, in particular HeNe gas lasers. The coherence length of the HeNe lasers can be several hundred meters in this case, so that the ranges required in industrial metrology can be achieved using relatively simple interferometer constructions. A combination of an absolute distance meter and an interferometer for distance determination using an HeNe laser is known, for example, from WO 2007/079600 A1.

By way of the use of such an interferometer for distance determination or determination of the distance change in a laser tracker, a very high measurement precision can be implemented as a result of the interferometric measuring method thus usable.

To ensure high measurement precisions, the tracker system must be calibrated before executing measurements. Such a calibration can, on the one hand, be carried out before delivery of the device, so that, for example, an offset of a target axis predefined by the structural construction of the tracker in relation to an emission axis along which the measurement radiation is emitted is previously known and is taken into consideration as measurements are carried out. On the other hand, a recalibration can and must be performed after a specific operating time of the system, since errors can occur in the system, for example, due to environmental influences (for example, temperature and/or pressure variations) or mechanical effects (for example, shocks).

In addition, fine calibration is to be provided at shorter intervals (for example, every time it is put into operation) with respect to very sensitive components or in the event of a relatively intensive stress of the measuring device, to continuously and progressively maintain required precisions.

Such a calibration can be provided in particular by multiple two-location measurements having significant distance differences to one or more separate reference targets, which can be freely offset in space. Calibration values for, e.g., a PSD offset, a target axis distance (=parallel offset), and/or a target axis error (=directional error) can be derived therefrom. Such a calibration is provided, for example, for the laser trackers "AT901" and "AT401" of Leica Geosystems AG.

This conventional procedure for calibration is contradictory in particular to a general requirement that all required components for calibration are to be integrated in the tracker system or permanently attached thereon.

In addition, such a method may only be carried out without user intervention when the measuring system is located in a fixed installation, in which a remote reflector can be permanently installed, for example, on an opposing building wall. However, for an application of a laser tracker as a mobile measuring system in changing surroundings, such a calibration using positionally fixed retroreflectors cannot be carried out.

To overcome these obstructions, U.S. Pat. No. 7,327,446 B2 discloses an arrangement of two different reflective objects on a laser tracker for its calibration. One of these objects is embodied as a cube prism and the second as a planar mirror, wherein self-calibration of the tracker can be carried out by targeting both the cube prism and also the planar mirror.

Especially due to the requirement that the components (mirror and prism) required for the self-compensation are located in or on the tracker, the calibration measurements can only be executed at essentially equal and relatively short distance, however. In particular, calibration of the system with respect to significantly different distances and in particular with respect to comparatively great distances (at least several meters), which occur during a typical use of such a tracker, thus cannot be executed. This represents a main disadvantage of this embodiment with respect to the most robust possible calibration, which is therefore valid and reliable for the measurement range to be covered. For typical calibration methods—as mentioned above—the necessity of a user intervention for the calibration is also to be noted as the main disadvantage.

SUMMARY

Some embodiments of the present invention provide an improved laser tracker, which can be calibrated by means of tracker-intrinsic means so that deviations from a structural target construction of the tracker, in particular with regard to the guiding of a tracker measurement laser radiation, can be determined more rapidly and precisely, in particular wherein the calibration is ensured precisely both for targets at relatively short distances and also at greater distances.

Some embodiments of the invention provide improved integrated calibration means for a laser tracker and an automated calibration of the tracker such that the ascertainment of calibration values can be carried out more rapidly, precisely, and robustly, so that the calibration is most substantially valid for an entire measurement range of the tracker, in particular without user intervention and for long distances.

Some embodiments of the present invention provide an improved self-calibratable laser tracker, wherein multiple measurements for significantly different distances are carried out for the calibration.

The invention relates to a laser tracker for the position determination of a target, in particular for the progressive tracking of the target, having a beam source for generating measurement radiation, a base, which defines a standing axis, and a support, which defines a tilt axis standing essentially orthogonally to the standing axis, wherein the support is pivotable by a motor in relation to the base about the standing axis and a horizontal pivot angle is defined by an alignment of the support in relation to the base. In addition, the laser tracker has a beam deflection unit, which is pivotable by a motor about the tilt axis in relation to the support, wherein a vertical pivot angle is defined by an alignment of the beam deflection unit in relation to the support, for emitting and aligning the measurement radiation and for receiving at least a part of the measurement radiation reflected on the target, angle measuring functionality for determining the horizontal pivot angle and the vertical pivot angle, distance measuring functionality, and a photosensitive surface detector for detecting a position of incidence of the reflected measurement radiation on the surface detector and for generating an output signal for controlling a target tracking functionality.

According to the invention, the base has a self-calibration unit having at least one first retroreflective reference target and at least one optical assembly acting as a reduction objective lens. The self-calibration unit can be targeted using the measurement radiation for determining at least one calibration parameter with respect to a position and/or direction of the measurement radiation for the laser tracker such that an optical beam path of the measurement radiation extends through the optical assembly and the measurement radiation is incident on the at least first retroreflective reference target, whereby a first calibration measurement can be carried out using a distance, which is simulated with respect to relevant measured variables for the determination of the at least one calibration parameter, to the at least first retroreflective reference target and the simulated distance is greater than an actually structurally provided distance to the at least first retroreflective reference target.

A simulated distance is understood in conjunction with the present invention as a distance to the reference target which can be "seen" in particular for the determination of the relevant measured variables for determining the at least one calibration parameter, but causes hardly any (or no) influence on any possible distance measurement to the reference target. By way of the optical assembly, in particular the direction of the measurement radiation is changed so that the measured variables in the case of a measurement to the reference target can be determined as if the reference target were at a greater distance than its actual distance, whereby a simulated distance to the target is therefore provided for the determination of these variables.

In particular, the relevant measured variables are represented in this case by the horizontal pivot angle, the vertical pivot angle, and/or the position of incidence on the photosensitive surface detector. I.e., the horizontal pivot angle, the vertical pivot angle, and the position of incidence during a calibration measurement, in which the measurement radiation is incident through the optical assembly on the reference target, can thus be determined as if the reference target is arranged at a greater distance, for example, from the surface detector than the structural distance to the reference target actually is.

By way of the arrangement according to the invention of the optical assembly in front of the reference retroreflector—because the optical assembly acts like a reduction optical system—the retroreflector arranged on the tracker can be measured as if it were located at a greater distance from the beam deflection unit, for example, than it is actually structurally located. A calibration of the tracker can thus be performed as if at least one reference target were targeted at a relatively long distance (in relation to the relevant measured variables).

In conjunction with the present invention, at least one surface sensor, which operates spatially in an analog manner, is to be understood as the position-sensitive surface detector or PSD (in particular tracking surface sensor), using which sensor a focal point of a light distribution on the sensor surface can be determined. The output signal of the sensor is generated in this case by means of one or more photosensitive surfaces and is dependent on the respective position of the light focal point. By means of electronics which are connected downstream or integrated, the output signal can be analyzed and the focal point can be ascertained. The ascertainment of the position of the focal point of the incident light spot can be performed very rapidly in this case (microsecond range) and with nanometer resolution. In particular, digitally operating sensors can also be provided as the PSD, which enable a comparable determination of a focal point of a light distribution on the sensor surface.

By means of PSD, a deviation of the point of incidence of the detected beam from a servo-monitoring point can be determined and tracking of the laser beam on the target can be performed on the basis of the deviation. For this purpose and to achieve a high precision, the field of vision of this PSD can be selected to be comparatively small, i.e., corresponding to the beam diameter of the measurement laser beam. A detection using the PSD typically occurs coaxially to the measurement axis, so that the detection direction of the PSD corresponds to the measurement direction. The application of the PSD-based tracking and the fine targeting can first be performed after the measurement laser has been aligned on a retroreflective target (at least coarsely, i.e., such that the target lies within the field of vision of the PSD).

The at least one calibration parameter, which the laser tracker according to the invention is embodied to determine, can represent a variety of device variables which are variable due to environmental influences, for example. These variables can have a decisive effect on the achievable precision of the tracker. The requirement of exact awareness of the respective variables is therefore provided for carrying out a measurement using the tracker and can be fulfilled using the tracker according to the invention—at least with regard to the parameters specified hereafter for the course of the measurement radiation.

The calibration parameter which can be determined specifies according to the invention at least one servo-monitoring point on the position-sensitive surface detector for regulating the alignment of the measurement radiation on the target in the scope of the target tracking functionality and/or indicates an offset, in particular a parallel offset, between a target axis defined by a structural implementation of the beam deflection unit and an emission axis defined by the emission of the measurement radiation, and/or specifies a target axis error which specifies an angle offset between the target axis and the emission axis.

A PSD offset (the distance between an electrical zero point of a position-sensitive surface sensor provided for the tracking and the servo-monitoring point, which represents an exact alignment in the x or y direction of the measurement radiation on the center of a retroreflective target and is incident reflected therefrom on this sensor point) is defined by the servo-monitoring point. The offset between target axis and emission axis is also known as the target axis distance (distance of an emission axis defined by an emission direction of the measurement axis to a target axis provided structurally by the embodiment of a beam deflection unit or to a tilt axis which is defined by the support). The target axis error (=directional error) indicates a deviation from a parallelism between emission axis and target axis.

With regard to the design of the optical assembly, according to the invention it can have at least two optical elements, in particular diffractive optical elements, for shaping the measurement radiation, in particular wherein at least one beam cross-sectional area of the measurement radiation can be reduced in size and/or a direction of the measurement radiation is variable. For example, mirrors, or—in particular as diffractive optical elements—lenses or alternative beam-shaping means can be used for this purpose.

By way of the respective implementation of the optical assembly, the assembly can have a specific imaging parameter, to cause the desired reduction effect. According to the invention, the optical assembly can define a specific optical imaging scale in the range between 0 and 1 in this context.

With respect to the aspect of the calibration of the laser tracker, according to the invention, at least one second calibration measurement using at least one further, in particular simulated, distance can be provided in that the self-calibration unit has a second retroreflective reference target, which can be targeted using the measurement radiation. Alternatively or additionally, the self-calibration unit according to the invention can have for this purpose a positioning unit implemented such that the optical assembly can be positioned in a defined manner in relation to the at least first and/or second retroreflective reference target, in particular can be relatively offset and/or rotated in a defined manner, in particular linearly in parallel to the optical beam path, and/or the at least first and/or second retroreflective reference target can be positioned in a defined manner in relation to the optical assembly, in particular can be offset linearly in parallel to the optical beam path. In this case, the at least one further distance differs from the simulated (first) distance.

Due to such an inclusion and provision of a further distance measurable using the measurement radiation, a calibration of the tracker to one or more targets can be performed at at least two different distances. The simulated distances, i.e., when the measurement radiation extends through an optical assembly, influence in particular the relevant measured variables for the determination of the at least one calibration parameter, but not a possible distance measurement to the reference target. In the case of a distance measurement, essentially the distance which is actually structurally provided to the target would be measured. Because these targets can be targeted (with the measurement radiation) both with and also without passing through the optical assembly, not only targets having small distance differences can be targeted, but rather, for example, a "close" target can be targeted without optical assembly and an (apparently) "far" target can be targeted with beam passage through the assembly.

The different distances for the targets, which can thus be targeted, can especially be generated differently according to the invention—as described hereafter.

On the one hand, the simulated distance can be generated by means of offsetting the optical assembly and/or offsetting the at least first or second retroreflective reference target by means of the positioning unit such that the optical beam path extends through the optical assembly and is incident on the at least first retroreflective reference target.

Furthermore, the at least one further distance can be generated by means of offsetting the optical assembly by means of the positioning unit out of the optical beam path such that the measurement radiation extends offset to the optical assembly.

Moreover, the at least one further distance can be generated by means of linear displacement of the at least first or second retroreflective reference target and/or the optical assembly, wherein the displacement can be carried out in parallel to the optical beam path.

In a special embodiment, the laser tracker according to the invention can have a control and analysis unit implemented such that a calibration functionality can be executed to determine the at least one calibration parameter. In the scope of the calibration functionality, a two-location measurement is performed using the simulated distance and/or using the at least one further distance, wherein, in the scope of the two-location measurement, two measurements are executed in two locations at two different horizontal pivot angles and at two different vertical pivot angles and for each of the two measurements the measurement radiation is aligned by means of alignment of the beam deflection unit in relation to the base on the reference target, which provides the simulated distance and/or the at least one further distance, of the self-calibration unit, the respective horizontal pivot angle and the respective vertical pivot angle are determined, and in each case the position of incidence of the measurement radiation, which is reflected on the respective reference target, on the photosensitive surface detector is determined. In addition, the at least one calibration parameter is derived in dependence on the determined horizontal pivot angles, vertical pivot angles, and positions of incidence. The two-location measurement represents in this case the first calibration measurement.

A two-location measurement (reversal measurement) is understood in conjunction with the present invention as two measurements to a target in two locations of the beam deflection unit, wherein the alignments of the beam deflection unit for the two locations have a defined alignment relationship to one another. The two measurements of the two-location measurement are executed at different horizontal pivot angles and vertical pivot angles in each case. I.e., a first measurement on the target is executed in a first alignment of the beam deflection unit and the support in relation to the base of the tracker and subsequently a second measurement (having the same distance to the target) is executed, wherein the support is pivoted in relation to the base and the beam deflection unit is pivoted in relation to the support in each case. The support is pivoted in this case essentially by 180° in relation to the base and the beam deflection unit is pivoted in relation to the support such that the measurement radiation is emitted essentially in the same direction (as for the first measurement), i.e., the beam deflection unit is located essentially in a (second) vertical pivot angle which is equal to the negative previously applied (first) vertical pivot angle.

In particular, the control and analysis unit can be implemented according to the invention such that during execution of one two-location measurement in each case for the simulated distance and the at least one further (in particular also simulated) distance in the scope of the calibration functionality, the servo-monitoring point on the position-sensitive surface detector for regulating the alignment of the measurement radiation on the target in the scope of the target tracking functionality and the offset, in particular parallel offset, between the target axis defined by the structural implementation of the beam deflection unit and the emission axis defined by the emission of the measurement radiation, and the target axis error, which specifies the angle offset between the target axis and the emission axis, are determined as calibration parameters.

Therefore, these three deviations of the measurement beam course from a target alignment for the radiation can be precisely calculated or derived mathematically from the detected horizontal and vertical pivot angles and the positions of incidence for the measurements by executing a two-location measurement in each case to at least two reference targets. Depending on the analysis of the measurements, the variables are possibly not calculated independently and individually in this case, but rather can be determined in a correlated manner, for example. In particular, the servo-monitoring point is determined in a correlated manner with the target axis distance.

According to one special embodiment, in the scope of the execution of the calibration functionality, by targeting at least the first retroreflective reference target by means of the optical assembly, an angle simulation at least in relation to the first retroreflective reference target can be caused such that a difference, which can be determined by the two-location measurement, of the horizontal pivot angle, vertical pivot angle, and the position of incidence is determined as if the at least first retroreflective reference target were at a greater distance than the actual distance of the reference target due to the structurally provided distance.

Possible measuring methods for determining at least one calibration parameter are described hereafter in particular in conjunction with the above-described two-location measurement.

With a permanently very stable arrangement of the optical assembly and the retroreflective reference target, a calibration parameter can be determined by the optical assembly for each direction (horizontal and vertical) using one single measurement in only one location of the beam deflection unit (and the support) in relation to the base.

In the case of a two-location measurement (consisting of a first measurement in a first location of the beam deflection unit and a second measurement in a second location of the beam deflection unit), strictly speaking, two measurements are executed in a very specific manner (alignment relation of the beam deflection unit). Therefore with respective measurement through the optical assembly to the reference target—one calibration parameter may also be determined per direction, wherein the requirements for the stability of the arrangement of optical assembly and retroreflector are less than for the derivation of the parameter from a measurement in only one location.

By way of a single measurement in only one location of the beam deflection unit through the optical assembly and a second measurement, also in only one location of the beam deflection unit, on a reference target at a second different distance (for example, when not targeting the reference target through the optical assembly), a determination of two calibration parameters per direction (horizontal and vertical) can be carried out in each case. For this purpose, a high level of stability of the structure is again to be presumed. The two measurements can be executed in this case in two locations (according to a two-location measurement, but not to a fixed target at a constant distance).

Using a two-location measurement consisting of a first measurement in location I of the beam deflection unit and a second measurement in location II of the beam deflection unit through the optical assembly to the reference target and a second two-location measurement, also consisting of a first measurement in location I and a second measurement in location II at a target (possibly also on the reference target for the first two-location measurement) at a second different distance, two calibration parameters can be determined per direction in each case, wherein the requirements to be fulfilled for the long-term stability of the structure are less. In this method, in principle four individual measurements are carried out, wherein two of these individual measurements are always executed in pairs such that two two-location measurements result therefrom.

According to a further embodiment of the laser tracker according to the invention, the self-calibration unit has a beam guiding unit for defining the optical beam path and for guiding the measurement radiation to the at least first and/or second retroreflective reference target, in particular wherein the beam guiding unit is implemented such that the measurement radiation can be deflected by means of the beam guiding unit, in particular by means of a mirror.

The invention furthermore relates to a calibration method for a laser tracker, which is implemented for the position determination of a target and also in particular for the progressive tracking of the target and has a beam source for generating measurement radiation, a base, which defines a standing axis, and a support, which defines a tilt axis standing essentially orthogonally to the standing axis, wherein the support is pivotable by a motor in relation to the base about the standing axis and a horizontal pivot angle is defined by an alignment of the support in relation to the base. Furthermore, the tracker has a beam deflection unit, which is pivotable by a motor about the tilt axis in relation to the support, wherein a vertical pivot angle is defined by an alignment of the beam deflection unit in relation to the support, for emitting and aligning the measurement radiation and for receiving at least a part of the measurement radiation reflected on the target, and has a photosensitive surface detector for detecting a position of incidence of the reflected measurement radiation on the surface detector and for generating an output signal for controlling a target tracking functionality. In the scope of the calibration method, an execution of at least one calibration measurement to at least one first retroreflective reference target is performed having a determination of the horizontal pivot angle, the vertical pivot angle, and the position of incidence of the measurement radiation, which is reflected on the at least first retroreflective reference target, on the photosensitive surface detector and a derivation of at least one calibration parameter with respect to a position and/or direction of the measurement radiation in dependence on the determined horizontal pivot angle, the determined vertical pivot angle, and the determined position of incidence.

According to the invention, during the execution of the at least one calibration measurement, the at least first retroreflective reference target is targeted such that an optical beam path of the measurement radiation extends through a reducing optical assembly and the measurement radiation is incident on the at least first retroreflective reference target, so that the calibration measurement is performed using a distance which is simulated with respect to relevant measured variables for the determination of the at least one calibration parameter, wherein the simulated distance to the at least first retroreflective reference target is greater than an actually structurally provided distance to the at least first retroreflective reference target, in particular wherein the relevant measured variables are represented by the horizontal pivot angle, the vertical pivot angle, and/or the position of incidence on the photosensitive surface detector. This simulated distance essentially has influence, as mentioned above, on the relevant measured variables (in particular horizontal pivot angle, vertical pivot angle, and position of incidence) and not on an actually measurable distance, i.e., with regard to a relevant angle measurement, the target appears to be farther away than it is actually structurally arranged; during a distance measurement, in contrast, essentially the actual structural distance would be measured.

In particular, for the calibration method according to the invention at least one further distance, in particular a simulated distance, is provided by targeting a second retroreflective reference target. Furthermore, the at least one further distance can be generated by an offset of the optical assembly in relation to the at least first and/or second retroreflective reference target.

According to one specific embodiment, according to the invention, for the simulated distance and/or for the at least one further (in particular also simulated) distance, at least two calibration measurements, in particular two calibration measurements in each case, can be executed at two different horizontal pivot angles and at two different vertical pivot angles. For each calibration measurement, in this case the measurement radiation is aligned by means of alignment of the beam deflection unit in relation to the base on the at least first and/or second retroreflective reference target, the respective horizontal pivot angle and the respective vertical pivot angle are determined, and in each case the position of incidence on the photosensitive surface detector is determined. The at least one calibration parameter is then derived in dependence on the horizontal pivot angles, the vertical pivot angles, and the positions of incidence.

In this case, in particular a servo-monitoring point on the position-sensitive surface detector for regulating an alignment of the measurement radiation on the target and an offset, in particular a parallel offset, between a target axis defined by the structural implementation of the beam deflection unit and an emission axis defined by the emission of the measurement radiation, and a target axis error, which specifies an angle offset between the target axis and the emission axis, can be determined according to the invention as calibration parameters.

According to the invention, the calibration method can be executed automatically, for example, after a starting signal for the execution has been provided.

In a special embodiment of the invention, a laser tracker can be implemented according to the invention such that an above-described calibration method according to the invention is executable therewith, in particular wherein a control and analysis unit of the laser tracker is implemented to execute the calibration method according to the invention.

A further aspect of the invention relates to a computer program product, which is stored on a machine-readable carrier, for controlling the execution of the at least one calibration measurement for at least one simulated distance and for executing the derivation of the at least one calibration parameter of a calibration method according to the invention, in particular when the computer program product is executed on a laser tracker according to the invention, in particular on a control and analysis unit of the laser tracker.

BRIEF DESCRIPTION OF THE DRAWINGS

The method according to the invention and the device according to the invention will be described in greater detail solely as examples hereafter on the basis of concrete exemplary embodiments which are schematically illustrated in the drawings, wherein further advantages of the invention will also be discussed. In the specific figures.

DETAILED DESCRIPTION

Figure 1:
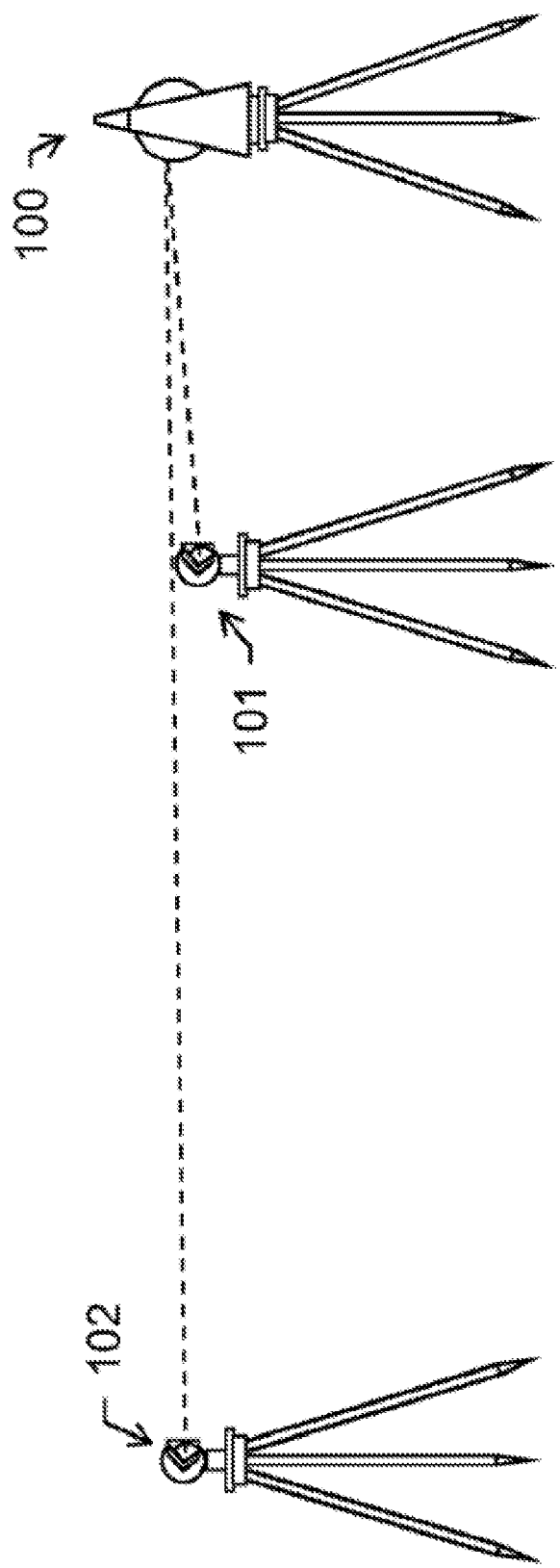
FIG. 1 shows a structure for a conventional, known calibration of a laser tracker having two separate retroreflective targets.

FIG. 1 shows a structure for a conventional, known calibration of a laser tracker 100 having two separate retroreflective targets 101, 102.

To ensure a required precision for measurements using a laser tracker 100, in general a calibration of various variables which influence measurement must be provided. These include in particular:

PSD offset (the distance between an electrical zero point of a position-sensitive surface sensor provided for the tracking and the servo-monitoring point, which represents an exact alignment in the x or y direction of the measurement radiation on the center of a retroreflective target and is incident on this sensor point reflected therefrom), target axis distance (distance of an emission axis defined by an emission direction of the measurement axis to a target axis provided structurally by the embodiment of a beam deflection unit or to a tilt axis, which is defined by the support), and target axis error (=directional error: deviations from a parallelism between emission axis and target axis).

At least these above-mentioned three parameters can be reliably determined in that multiple two-location measurements are carried out having significant distance differences to the targets 101, 102.

For this purpose, typically a first measurement is executed having a first determined alignment of the beam deflection unit on a target 101, 102. For the second measurement (second location), the support is pivoted by essentially 180° in relation to the base and the beam deflection unit such that the measurement radiation is also incident in this alignment of the support on the target 101, 102, i.e., the beam deflection unit is essentially located in the negative of the previously applied vertical pivot angle.

According to the embodiment shown of the calibration, two separate reflectors 101, 102 are used; however, in practice only one single reflector can also alternatively be used for this purpose and can be displaced with regard to the distance which can be generated in relation to the tracker 100. This procedure also enables using more than the two observations which are required for the determination of the parameters with mathematical uniqueness (error recognition and precision increase by redundancy).

For the at least four measurements to be executed for the calibration method shown here, in each case a point of incidence on the surface sensor of the tracker 100 and the horizontal pivot angle and vertical pivot angle are determined. The calibration parameters are determined thereafter from a consideration of these measured variables together. In this case, the parameters can each individually be determined independently, or at least one parameter variable can be determined, which specifies an interaction or a cooperation (mutually correlated) of at least two of the parameters.

A correlation between PSD offset and target axis distance does not represent a problem mathematically, since both variables may be replaced by a shared calibration value. As long as PSD offset and target axis distance are small enough, the beam overlap between outgoing and returning beam at the interferometer (IFM) and absolute distance meter (ADM) also remains sufficiently good for reliable measurements.

Figure 2:
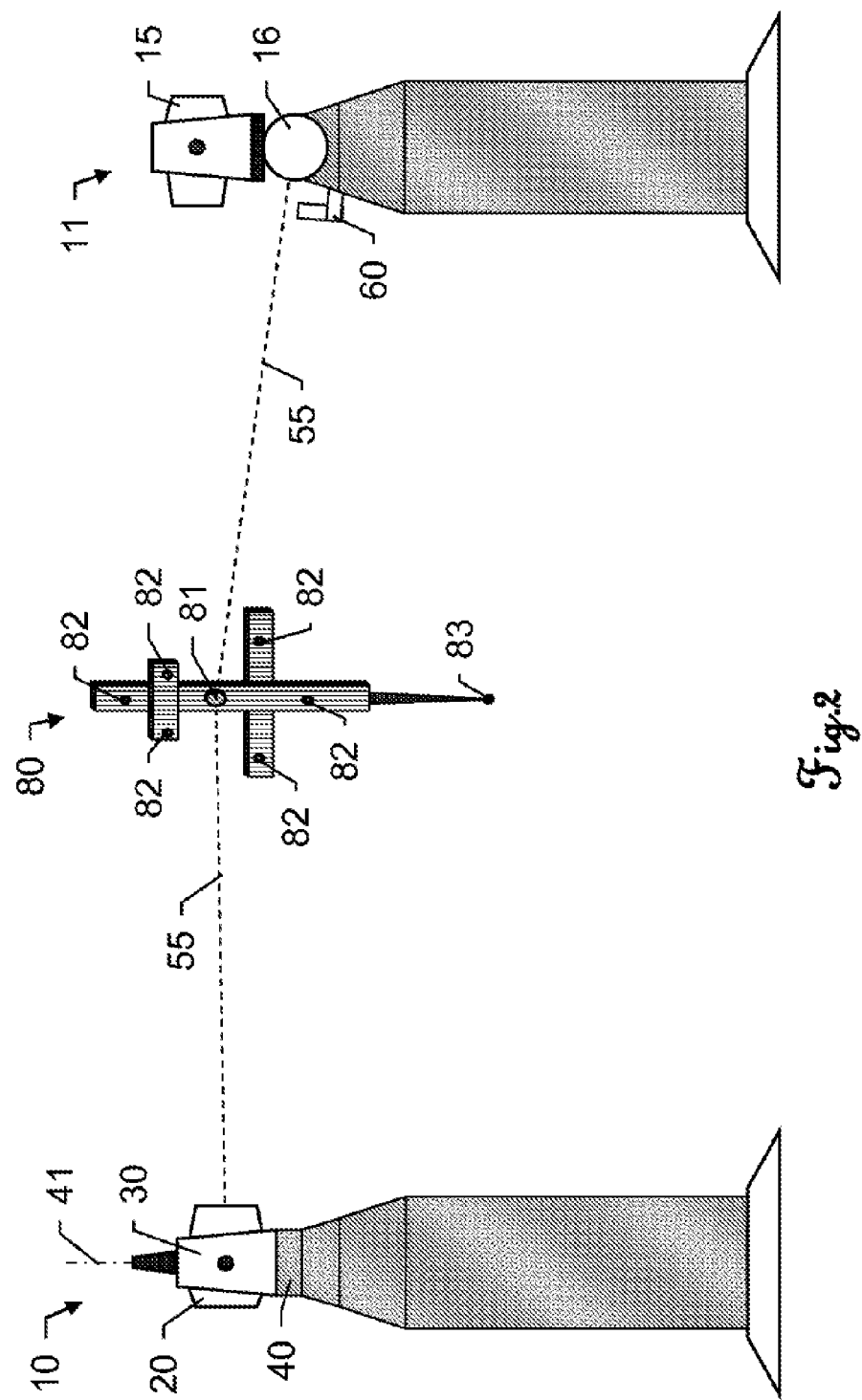
FIG. 2 shows two embodiments of laser trackers according to the invention and a measuring aid instrument.

FIG. 2 shows two embodiments of laser trackers 10, 11 according to the invention and a measuring aid instrument 80 (tactile measuring device). The first laser tracker 10 has a base 40 and a support 30, wherein the support 30 is arranged so it is pivotable or rotatable in relation to the base 40 about a pivot axis 41, which is defined by the base 40. In addition, a targeting unit 20 (beam deflection unit) is arranged on the support 30 such that the beam deflection unit 20 is pivotable in relation to the support 30 about an inclination axis (transit axis). By way of an alignment capability of the beam deflection unit 20 provided thus about two axes, a laser beam 55 (measurement radiation) emitted from this unit 20 can be aligned exactly and therefore targets can be targeted. This alignment can be performed automatically by means of motorization. The pivot axis 41 and the inclination axis are arranged essentially orthogonally to one another in this case, i.e., slight deviations from an exact axis orthogonality can be predetermined and stored in the system, for example, to compensate for measurement errors thus resulting.

In the arrangement shown, the measurement laser beam 55 is oriented on a reflector 81 (retroreflector) on the measuring aid instrument 80 and is retroreflected thereon back to the laser tracker 10. By means of this measurement laser beam 55, a distance to the reflector 81 can be determined, in particular by means of runtime measurement, by means of the phase measurement principle, or by means of the Fizeau principle. The laser tracker 10 has for this purpose a distance measuring unit (having interferometer and absolute distance meter) for determining this distance between the tracker 10 and the reflector 81 and has angle meters, which make it possible to determine a position of the targeting unit 20, by means of which the laser beam 55 can be aligned and guided in a defined manner, and therefore make it possible to determine a propagation direction of the laser beam 55. In other words: due to the above-described provided ability to determine the distance by means of the measurement radiation, a distance measuring functionality of the laser tracker is provided and, due to the ability to determine the angle position of the targeting unit, a corresponding angle measuring functionality of the laser tracker is provided.

In addition, the laser tracker 10, in particular the beam deflection unit 20, has an image detection unit for the purpose of determining a position of a sensor exposure on a sensor or in a detected image of a CMOS or is implemented in particular as a CCD camera or pixel sensor array camera. Such sensors permit a position-sensitive detection of detected exposure on the detector. Furthermore, the measuring aid instrument 80 has a tactile sensor, the contact point 83 of which can be brought into contact with a target object to be surveyed. While this contact exists between the scanning tool 80 and the target object, a position of the contact point 83 in space and therefore the coordinates of a point on the target object can be exactly determined. This determination is performed by means of a defined relative positioning of the contact point 83 to the reflector 81 and to orientation markings 82 arranged on the measuring aid instrument 80, which can be implemented as light-emitting diodes, for example. Alternatively, the orientation markings 82 can also be implemented such that they reflect the incident radiation in the event of illumination, for example, using radiation of a defined wavelength (for example, orientation markings 82 implemented as retroreflectors), in particular they display a specific lighting characteristic, or they have a defined pattern or color coding. Therefore, an orientation of the scanning tool 80 can be determined from the location or distribution of the orientation markings 82 in an image detected using the sensor of the image detection unit.

The second laser tracker 11 has a beam deflection unit 16, which is separate from the image detection unit 15, for emitting a second laser beam 55, which is also aligned on the reflector 81. Both the laser beam 55 and also the image detection unit 15 are each pivotable by a motor about two axes (about in each case a tilt axis and a shared standing axis, which are defined by the structure of a base and of a respective support) and can thus be aligned such that, by means of the image detection unit 15, the target 81 targeted using the laser beam 55 and the orientation markings 82 of the measuring aid instrument 80 can be detected. Therefore, a precise distance to the reflector 81 and an orientation of the instrument 80 can also be determined here on the basis of the spatial location of the orientation markings 82.

For the respective alignment of the laser beams 55 on the reflector 81, illumination means for illuminating the reflector 81 with radiation of a specific wavelength, in particular in the infrared wavelength range, are provided in each case on the laser trackers 10, 11, and additionally at least one target search camera having a position-sensitive detector, a so-called ATR camera (automatic target recognition), is arranged on each tracker 10, 11. The illumination radiation which is reflected on the reflector 81 and reflected back to the laser tracker 10, 11 can respectively be detected by means of the camera and a position of the reflector 81 on the respective detector can be imaged using the position-sensitive detectors. Therefore, both using the first laser tracker 10 and also using the second laser tracker 11, an imaged position of the reflector can be determined and, in dependence on these detected search image positions, the target (reflector 81) can be located in the image and the targeting unit 20 or the beam guiding unit 16 (beam deflection unit) can be aligned such that the target is automatically targeted using the measuring beam 55 or the target 81 is automatically (iteratively) approached using the laser beam 55. For a robust detection of the reflections, filters can be installed in the target search camera in particular (for example, wavelength-dependent filters), which, for example, only transmit the light emitted by the illumination means, and/or threshold values can be stored for a comparison of the detected signals to signal target values in the laser tracker.

In addition, the laser trackers 10, 11 according to the invention can each have an overview camera, the field of vision of which—in comparison to the fields of vision of the target search cameras having position-sensitive detectors—is larger and therefore allows a larger range to be detected. Using these overview cameras, images of objects and targets in the visual light spectrum can be detected, wherein these images can be output by means of a display unit on the laser trackers and/or on a display screen, which is arranged on a respective control unit for controlling the respective laser tracker 10, 11. Color images can especially be detected using the overview camera.

The illumination means, the target search cameras, and/or the overview camera can each be arranged in this context, for example, on the image detection unit 15, the beam guiding unit 16, the targeting unit 20 (beam deflection unit), the support 30, and/or the base 40 in defined positions.

The distance measuring unit of the respective laser tracker 10, 11 provides an item of distance information to the target 81 on the basis of a determination of a relative or absolute distance between the respective tracker 10, 11 and the target 81 and a determination of a change of this distance (i.e., a distance measuring functionality of the laser tracker, i.e., a functionality for measuring the distance, is provided). If in this case the absolute distance is determined in particular by means of runtime measurement, by means of the phase measurement principle, or by means of the Fizeau principle, to determine the distance change, a measurement is thus carried out using an interferometer assigned to the respective distance measuring unit. For this purpose, a beam source for generating laser radiation is provided on each of the laser trackers 10, 11, wherein the generated radiation is divided at least into a reference radiation and a measurement radiation 55. The reference radiation is guided along a known reference path (length of the path is known) to an interferometer detector. In an alternative embodiment, the length of the reference path can at least be constant, wherein the length of the path does not have to be known. In dependence on the arrangement and embodiment of the optical components (for example, detector), the length of the reference path can be "zero" in particular. The measurement radiation 55, in contrast, is emitted from the tracker 10, 11 such that it is incident on the target 81 and is reflected back thereon. The reflected beam or parts of the reflected beam are then in turn detected on the part of the tracker 10, 11 and guided along a measurement path, also to the interferometer detector, where the reference radiation is overlaid with the received measurement radiation 55. An interference of the two radiations results due to this overlay, which can be detected and resolved on the detector.

By way of this interference, maxima (constructive interference) and minima (destructive interference) of radiation intensity are generated. The intensity is in this case dependent on a beam path difference between the two beams incident on the detector. Since the reference path and therefore the distance which is covered by the reference radiation to the detector can be kept constant, the path difference is essentially dependent on the distance between the respective laser tracker 10, 11 and the target 81. Accordingly, if the distance between the tracker 10, 11 and the target 81 is changed, the path difference thus also changes and therefore, during the distance change, the intensity of a detected interference state as an interferometer output variable (interference pattern) also changes.

During such a relative movement (wherein the distance is changed) between at least one of the laser trackers 10, 11 and the target 81, high and low intensities can alternately be established at the interferometer detector. In consideration of the wavelength of the measurement radiation 55 (and the reference radiation), a relative distance, i.e., a change of the distance, to the target 81 can be calculated from a progressive detection of the interference state as an interferometer output variable. In particular, the detected intensity maxima and/or intensity minima are progressively counted (as interferometer pulses) in this case.

According to the invention, a self-calibration unit (not shown) according to the invention is integrated in the base 40 of the laser tracker 10, which can be targeted using the measurement radiation 55 (by targeting using the beam deflection unit 20) and which has at least one retroreflective reference target and an optical assembly for providing a simulated distance to this reference target, wherein the reference target appears to be at a greater distance when it is targeted through the optical assembly (for the determination of horizontal pivot angle, vertical pivot angle, and/or position of incidence), than the real, structural distance to the target is. A calibration of the tracker can thus be performed by a determination of an alignment of the beam deflection unit 20 in relation to the base 40 and a position of incidence on the PSD assigned to the beam deflection unit for measurements in the case of targeting the at least one reflector (in particular for different (simulated) distances, which can be provided by the self-calibration unit).

A self-calibration unit 60 according to the invention which can be targeted using the measurement radiation by means of the beam guiding unit 16 is also arranged on the laser tracker 11. A calibration of the tracker 11 can therefore be performed by means of targeting the self-calibration unit 60, wherein this unit 60 has at least one retroreflector and an optical assembly which acts like a reduction objective lens. During the targeting or multiple targeting, different distances can be generated or directly provided by the self-calibration unit 60 for the determination of the relevant measured variables to the at least one retroreflector by means of an optical imaging scale (through the optical assembly).

The position (and orientation) of the self-calibration unit on the respective tracker 10, 11 is known, so that, for example, a distance from the respective beam deflection unit 16, 20 to the respective self-calibration unit or to the respective at least one reflector is provided. In addition, the positional arrangement of the optical assemblies and the retroreflector with respect to the self-calibration units is known, so that the simulated distance is also known (by way of the imaging factor of the optical assembly and by way of the actual distance between assembly and retroreflector).

Figure 3:
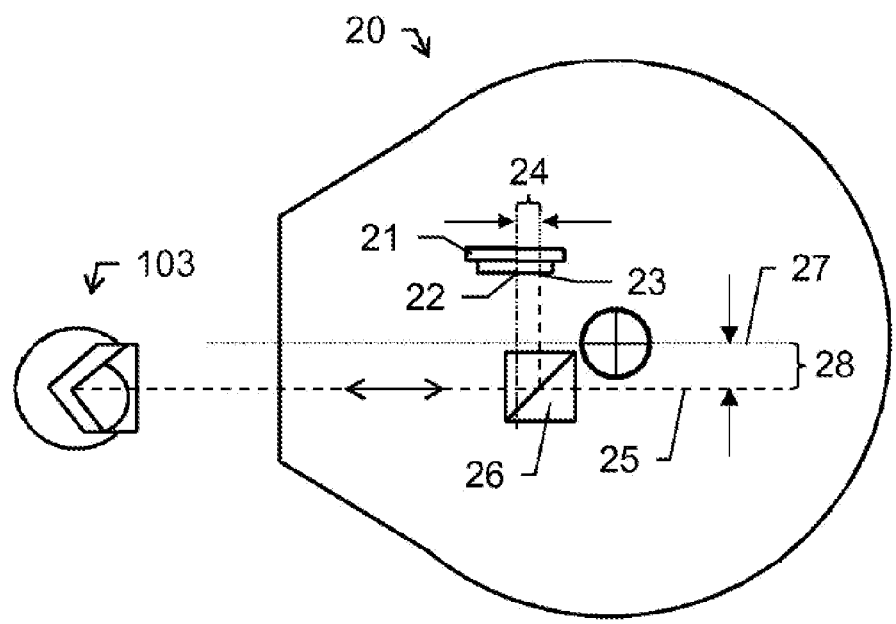
FIG. 3 shows a beam deflection unit of a laser tracker according to the invention and a retroreflector.

FIG. 3 shows a beam deflection unit 20 of a laser tracker according to the invention and a retroreflector 103. In the embodiment shown, a photosensitive surface detector 21 (PSD) is integrated in the beam deflection unit 20 and is also pivoted during an alignment of the measurement radiation. To generate the measurement radiation, for example, a laser diode or a gas laser (for example, HeNe laser) can be provided, wherein the beam source is also assigned to the beam deflection unit 20 or another part of the tracker, for example, in the base or the support.

The measurement radiation can be emitted along the emission axis 25 and can be aligned on the retroreflector 103 such that it is incident on the reflector 103 in the center thereof and the radiation is retroreflected therefrom. The beam reflected on the target 103 is guided by means of a beam deflection element 26, for example, a beam splitter, onto the PSD 21 and is incident thereon at a position which can be determined by the design of the PSD 21. In the alignment shown, the beam is incident on the servo-monitoring point 23, since the beam deflection unit 20 is regulated perfectly on the reflector 103 (on its center).

The servo-monitoring point 23 represents a determined position on the PSD 21, which is used for automatically targeting and tracking a target 103. If the measurement beam reflected on the target 103 is detected at this location, the beam is thus aligned on the center of the reflector 103. If the position of incidence on the PSD 21 deviates from the servo-monitoring point 23, a (re-) alignment of the measurement radiation can be performed in dependence on this deviation controlled such that the beam is incident on the center of the reflector 103.

For this purpose, the servo-monitoring point 23 does not have to correspond with the electrical zero point 22 of the surface detector 21, but must be or become calibrated to ensure precise measurements using the tracker. The offset 24 between the electrical zero point 22 and the servo-monitoring point 23 is also called the PSD offset 24 and specifies a relative positioning of the two points 22, 23.

A further offset 28 to be calibrated (target axis distance) arises in that the measurement radiation is emitted along the emission axis 25, wherein the emission axis 25 does not extend coaxially to a target axis 27 predefined by the structural implementation of the beam deflection unit 20. The target axis 27 intersects, according to the embodiment shown here, a tilt axis defined by the support of the laser tracker, about which the beam deflection unit 20 is rotatable by a motor. In addition, the target axis 27 intersects here the standing axis, which is defined by the base of the tracker, and about which the support can be pivoted. In particular, a shared intersection point for standing axis, tilt axis, and target axis 27 results, wherein the offset (smallest distance) of the emission axis 25 to this intersection point forms the target axis distance 28.

Furthermore, a target axis error can be present due to a directional error between target axis 27 and emission axis 25 (not shown here), i.e., the emission axis 25 not only does not extend coaxially, but rather additionally does not extend in parallel to the target axis 27.

Precise targeting of a reflector 103 is provided in that these three deviations are known and are calibrated in the system or at least are calibrated at specific intervals (for example, every time the tracker is put into operation). According to the invention, this calibration—in contrast to a conventional calibration operation according to FIG. 1—can be performed automatically, i.e., without intervention of a user, and without additional targets 103 which are separate from the tracker.

Figure 4:
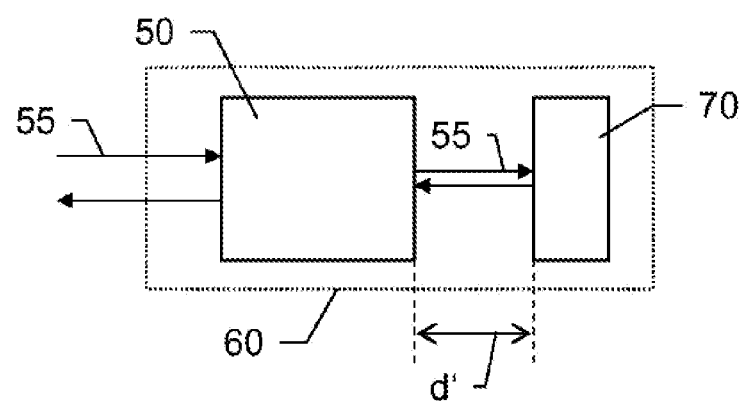
FIG. 4 shows the principle of a distance simulation according to the invention using a self-calibration unit having an optical assembly and a retroreflective reference target.

For this purpose, according to the invention, at least one retroreflective reference target 70 is combined with the base of the tracker and a simulated distance to the target 70 is generated (by use of the optical assembly), which appears to be greater for the determination of the relevant measured variables than a structurally predefined distance to the target 70. In FIG. 4, the principle of this distance simulation according to the invention is shown in general. In this case, a self-calibration unit 60 having an optical assembly 50 and a retroreflective reference target 70 is provided.

For the calibration of a laser tracker using this self-calibration unit 60, the measurement radiation 55 is aligned on the self-calibration unit 60 such that the optical beam path of the measurement radiation 55 extends through the optical assembly 50 and this is retroreflected on the reference target 70. Because of the structural arrangement of the components, a distance d' is provided between the optical assembly 50 and the reference target 70.

The optical assembly is designed so that the measurement radiation is influenced as it passes through this assembly 50 such that, in particular by way of a direction change of the measurement radiation, the reference target 70 appears to be at a distance different from the real distance d' with regard to the relevant measured variables for the determination of the at least one calibration parameter. By means of the optical assembly 50, a factor F is therefore introduced into the system, which provides a specific optical imaging ratio of the reference target 70 in relation to the beam deflection unit of the tracker.

To determine the (optical) distance D to the reference target which is simulated by this arrangement, the factor F is multiplied by the real distance d' and a distance between the optical assembly 50 and an instrument axis of the tracker is added (for example, route between the optical assembly 50 and distance meter).

It is obvious that, in the scope of the design of an optical assembly 50, beam-influencing elements of any type are usable in general, using which distances "can be simulated" according to the invention, wherein the distances are significantly different from the real distances thereof, for example, optical gratings, mirrors, liquids, etc.

Figure 5:
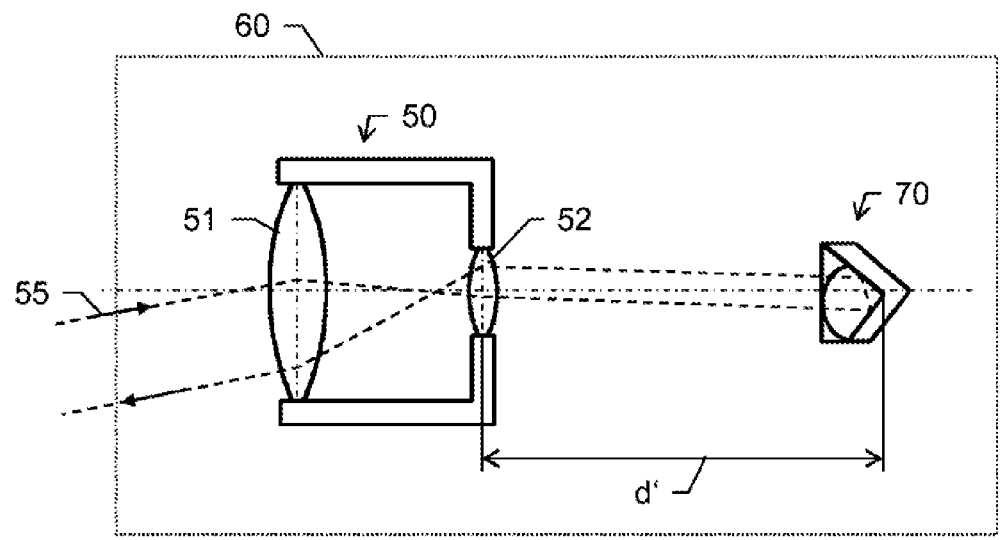
FIG. 5 shows a first embodiment of a self-calibration unit according to the invention having an optical assembly embodied as a (reversed) beam expander having two optically diffractive elements.

A first embodiment according to the invention for the simulation of the distance is shown in FIG. 5. The optical assembly 50 of the self-calibration unit 60 is embodied in this case as a (reversed) beam expander having two optically diffractive elements 51, 52, for example, lenses, whereby a change of the beam course of the entering measurement radiation 55 is achieved. The beam expander 50 acts in this case as a reduction objective lens and causes the reference target 70, which is implemented as a retroreflector, to appear to be farther away from the assembly 50 than the actual distance d' is.

The measurement radiation 55 reflected on the reflector is emitted offset in parallel to the entering radiation after a further passage through the reversed beam expander 50. If the measurement radiation 55 is incident centrally on the reflector 70, the reflected radiation is thus reflected back coaxially to the entering radiation.

By way of such an arrangement, a simulated distance to a reflector 70 can therefore be generated within a comparatively limited structural space, which is multiple times greater than the real distance d' predefined by the arrangement of the reflector.

The enlargement factor of the reversed beam expander 50, which is defined by the diffractive elements 51, 52, specifies how much a real distance d' can be optically shortened. This enlargement factor is incorporated in squared form into a calculation of the simulated distance: shortening factor=enlargement factor$^2$.

This means that the real distance d' corresponds to a simulated distance D which is longer by a multiplication with the enlargement factor$^2$. In the case of a reversed beam expander having an enlargement factor 10, for example, a real distance of the retroreflector 70 of 100 mm would be sufficient to generate a simulated distance D of 10 m therewith.

FIGS. 6a-d each show one embodiment of a self-calibration unit 60 according to the invention or of an arrangement according to the invention of optical assembly 50 and reference target 70, to provide a simulated distance D to the reference target 70.

Figure 6A:
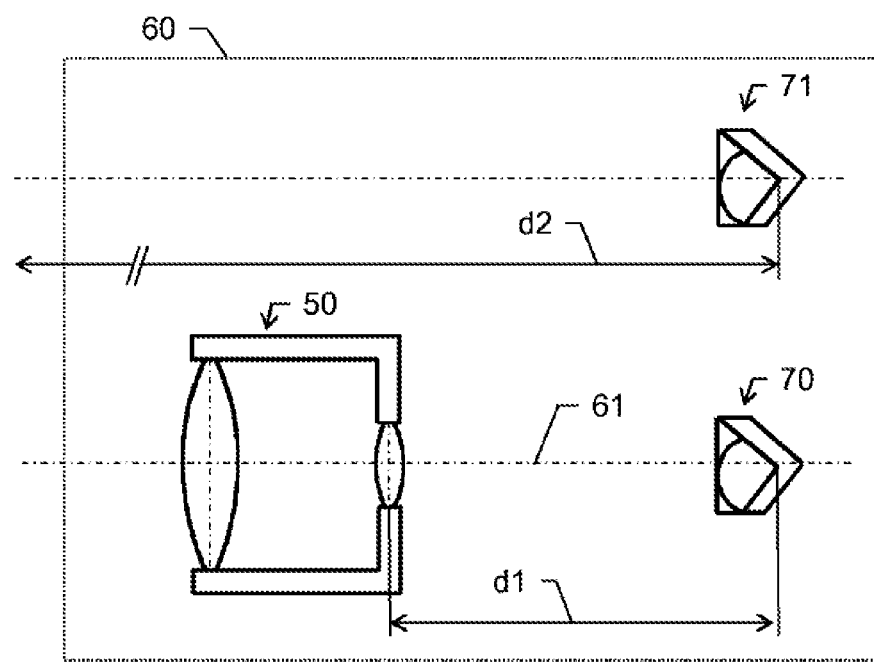
FIGS. 6*a-d* each show an embodiment according to the invention of a self-calibration unit or of an arrangement according to the invention of optical assembly and reference target for simulation of an optical distance to the reference target.

FIG. 6a shows a self-calibration unit 60 according to the invention having two reference targets 70, 71 and an optical assembly 50 implemented as a reversed beam expander, wherein the assembly 50 and one of the reference targets 70 are arranged so that this target can be targeted with a passage of the incident measurement radiation through the optical assembly 50 (here: shared optical axis 61). Therefore, upon targeting of the first reference target 70, a simulated distance to this target is generated, which appears multiple times greater than the real distance d1 between reference target 70 and optical assembly 50 for the determination of the relevant measured variables (horizontal pivot angle, vertical pivot angle, and/or position of incidence).

In contrast, the second reference target 71 can be targeted without the measurement radiation passing through an optical assembly. Therefore, a comparatively short distance d2, which corresponds to the real distance between the retroreflector 71 and, for example, the beam deflection unit, is provided by this second reference target 71—in comparison to the simulated distance by means of target 70.

By way of this embodiment of the self-calibration unit 60, therefore two significantly different distances to the two targets 70, 71 are provided or "simulated". This enables the execution of a calibration of the laser tracker (on the base of which the self-calibration unit is arranged) by targeting both targets 70, 71 in two locations in each case (two-location measurement). The first target 70 is firstly targeted by means of alignment of the beam deflection unit of the tracker such that the measurement radiation is incident on the target 70. In this case, the horizontal and the vertical pivot angles (alignment of the beam deflection unit in relation to the support and alignment of the support in relation to the base) and the position of incidence of the retroreflected measurement radiation on the tracking PSD are deflected. The support is then essentially pivoted by 180° and the beam deflection unit is again aligned to target the target 70 by means of the measurement radiation. In this second position, the horizontal and the vertical pivot angles and the position of incidence are again detected. In addition, these two measurement steps are performed for the second target 71.

Calibration parameters, which specify at least one PSD offset, target axis error, and/or target axis distance, can then be calculated from the determined measured variables of these four measurements by way of a consideration of the variables.

Figure 6B:
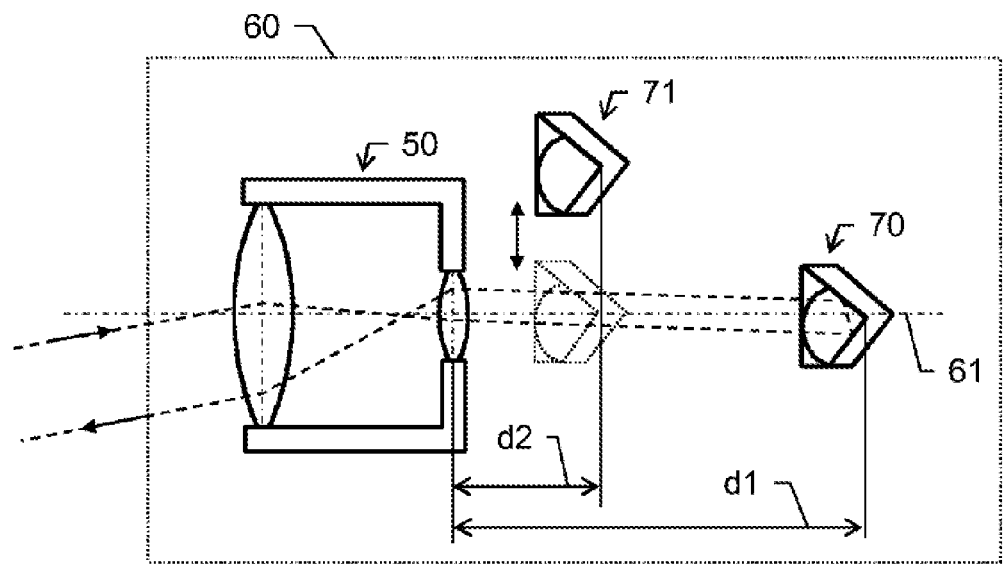

FIG. 6b shows a further embodiment of a self-calibration unit 60 according to the invention having two reference targets 70, 71 and an optical assembly 50 implemented as a beam-expanding optic, wherein the first reflector 70 is arranged in a fixed position relationship (and on a shared optical axis 61) to the optical assembly 50 and thus a first distance d1 between assembly 50 and reflector 70 is defined and a first simulated distance D1 (again especially for the relevant measured variables) is provided. The second retroreflective reference target 71 is embodied so it can be offset such that this target 71 can be introduced into or displaced out of the optical beam path.

By introducing the second reflector 71 into the beam path, a second distance d2 to the optical assembly 50 is defined and a second simulated distance D2 is generated. Because the optical assembly defines a specific imaging factor (enlargement or reduction factor), the simulated distances D1, D2 have a greater (or smaller) absolute difference from one another than the difference between the distances d1 and d2.

Therefore, two significantly different simulated distances D1 and D2 are provided for the determination of the measured variables, wherein in each case calibration measurements can be carried out using these two distances D1, D2.

Figure 6C:
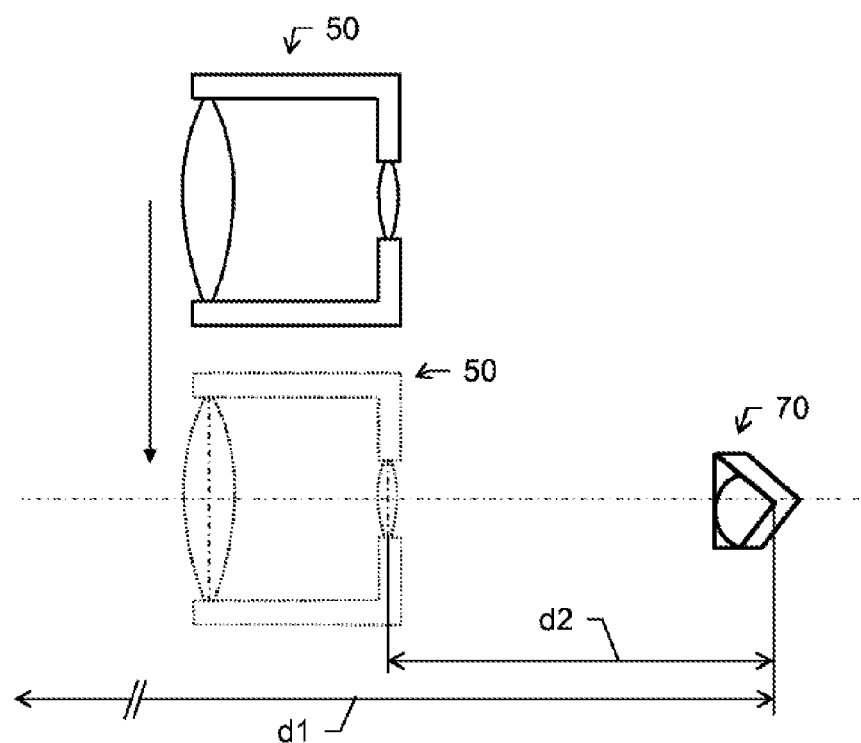

FIG. 6c shows a further embodiment of an arrangement according to the invention of an optical assembly 50 and a retroreflector 70 for the definition of a virtual, simulated distance, wherein the optical assembly 50 is implemented as a (reversed) beam expander and can be placed (for example, can be pivoted or moved) in front of the reflector 70. The reversed beam expander 50 is arranged in this case so that it can be moved into the optical beam path (onto the optical axis) or can be removed therefrom.

To provide different distances for the calibration of a laser tracker, in this embodiment the target 70 is targeted in each case, wherein, on the one hand, a real distance d1 is provided as the first calibration distance (beam expander is not in the beam path) and, on the other hand, a simulated distance can be generated as the second calibration distance, if the reversed beam expander 50 is located in the beam path. The second calibration distance is then defined by an enlargement factor of the reversed beam expander 50 and the distance d2, wherein in addition the distance of the reversed beam expander 50 to the beam deflection unit must be taken into consideration.

Figure 6D:
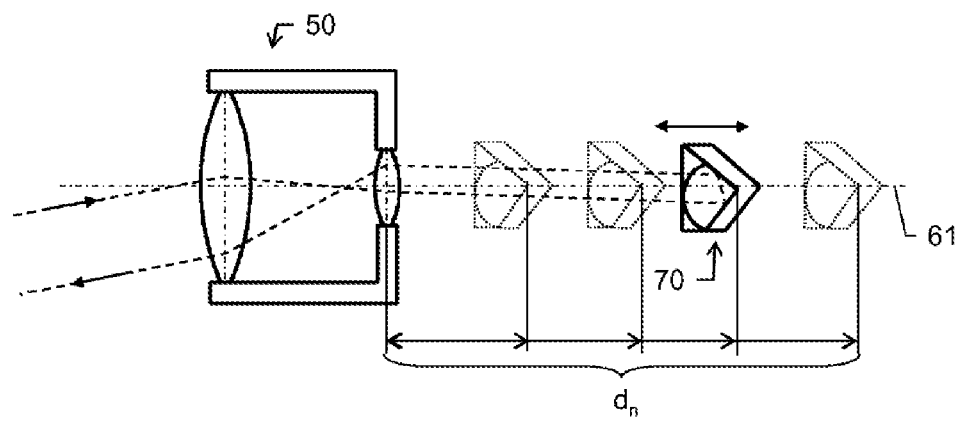

FIG. 6d shows a further embodiment of an arrangement according to the invention of an optical assembly 50 and a retroreflector 70 for generating a simulated distance, wherein the retroreflector 70 is linearly movable along the optical axis 61.

This enables, instead of only providing discrete distances between the optical assembly 50 and the reflector 70, an arbitrary number of such distances $d_n$ to be implemented within a bandwidth predefined by the length of the movement path, and thus multiple different simulated distances $D_n$ to be generated. By way of a calibration measurement using these multiple simulated distances $D_n$, improved error recognition and precision increase (by redundancy) can be implemented.

For sufficiently precise determination of the distances $d_n$ for the calibration measurements, in particular a linear distance generator or an alternative distance determination unit is provided in conjunction with the movable retroreflector 70.

In a further embodiment according to the invention of a self-calibration unit (not shown), the optical assembly is implemented as a zoom objective lens and the retroreflective reference target is placed fixed in position in relation to the zoom objective lens. Upon targeting of the reference target, the measurement radiation passes through the objective lens. Therefore, by changing the zoom factor of the objective lens, different distances which can be simulated to the reference target can also be generated and calibration measurements can be carried out at these distances which can be simulated.

According to a further embodiment according to the invention of a self-calibration unit 60 (also not shown), instead of or in addition to the retroreflector 70, the optical assembly 50 is linearly movable along the optical axis 61.

Figures 7A, 7B:
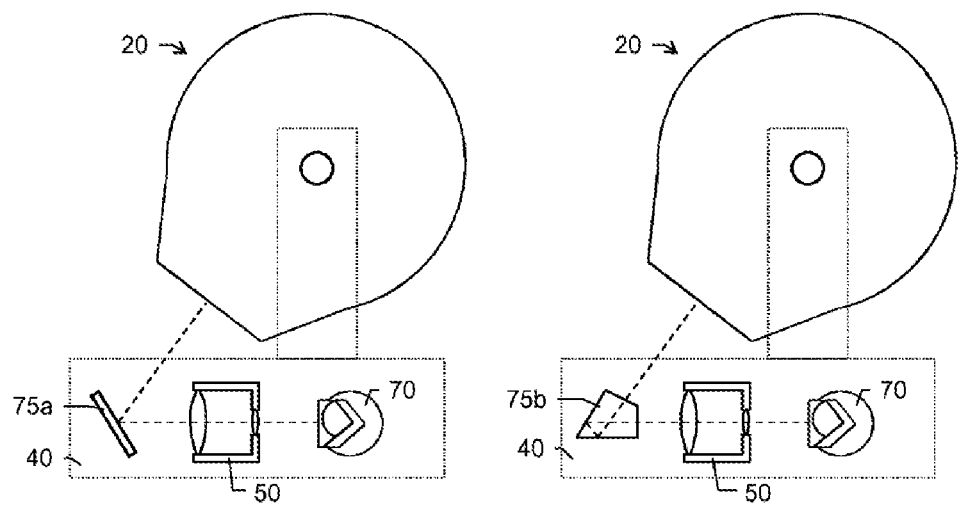
FIGS. 7*a-b* each show an exemplary embodiment of a laser tracker according to the invention having a beam deflection unit and a self-calibration unit integrated in the base of the tracker.

FIGS. 7a and 7b each show one exemplary embodiment of a laser tracker according to the invention having a beam deflection unit 20 and a self-calibration unit integrated in the base 40 of the tracker. The self-calibration unit of the embodiment according to FIG. 7a has a beam deflection means, which is embodied as a mirror 75a, in the base 40, by means of which a measurement beam can be guided through the optical assembly 50, so that the radiation is incident on the reference target 70. The embodiment according to FIG. 7b has, instead of the mirror 7a, a deflection prism 75b for deflecting the measurement beam. In this context, a use of alternative beam deflection means for beam guiding on the optical assembly 50 is additionally possible. A calibration of the system can be performed as described above using this arrangement.

It is obvious that these illustrated figures only schematically illustrate possible exemplary embodiments. The various approaches can be combined according to the invention both with one another and with calibration methods and with measuring devices of the type in question, in particular laser trackers, of the prior art.

What is claimed is:
1. A laser tracker comprising:
a beam source for generating measurement radiation;
a base, which defines a standing axis;
a support, which defines a tilt axis standing essentially orthogonally to the standing axis, wherein:
the support is pivotable by a motor in relation to the base about the standing axis, and
a horizontal pivot angle is defined by an alignment of the support in relation to the base;
a beam deflection unit, which is pivotable by a motor about the tilt axis in relation to the support, wherein a vertical pivot angle is defined by an alignment of the beam deflection unit in relation to the support, wherein the beam deflection unit is configured for emitting and aligning the measurement radiation and for receiving at least a part of the measurement radiation reflected on a target;
angle meters for determining the horizontal pivot angle and the vertical pivot angle;
a distance meter for determining a distance to the target; and
a photosensitive surface detector for detecting a position of incidence of the reflected measurement radiation on the surface detector and for generating an output signal for aligning the beam deflection unit for tracking the target;
wherein the base has a self-calibration unit having:
at least one first retroreflective reference target;
at least one optical assembly acting as a reduction objective lens; and the self-calibration unit can be targeted using the measurement radiation for determining at least one calibration parameter with respect to a position and/or direction of the measurement radiation for the laser tracker such that an optical beam path of the measurement radiation extends through the optical assembly and the measurement radiation is incident on the at least first retroreflective reference target, wherein:
a first calibration measurement can be carried out using a distance, which is simulated with respect to relevant measured variables for the determination of the at least one calibration parameter, to the at least first retroreflective reference target; and
the simulated distance is greater than an actually structurally provided distance to the at least first retroreflective reference target.

2. The laser tracker as claimed in claim 1, wherein:
the relevant measured variables are represented by the horizontal pivot angle, the vertical pivot angle, and/or the position of incidence on the photosensitive surface detector.

3. The laser tracker as claimed in claim 1, wherein:
the at least one calibration parameter specifies:
a servo-monitoring point on the position-sensitive surface detector for regulating the alignment of the measurement radiation on the target in the scope of the target tracking and/or;
an offset between a target axis defined by a structural implementation of the beam deflection unit and an emission axis defined by the emission of the measurement radiation; and/or
a target axis error which specifies an angle offset between the target axis and the emission axis.

4. The laser tracker as claimed in claim 1, wherein:
the optical assembly has at least two optical elements for shaping the measurement radiation, wherein at least one beam cross-sectional area of the measurement radiation can be reduced in size and/or the beam path of the measurement radiation is variable, and/or the optical assembly defines a specific optical imaging scale in the range between 0 and 1.

5. The laser tracker as claimed in claim 3, wherein:
the optical elements comprise diffractive optical elements.

6. The laser tracker as claimed in claim 1, wherein:
at least one second calibration measurement using at least one further distance is provided in that the self-calibration unit:
has a second retroreflective reference target, which can be targeted using the measurement radiation; and/or
has a positioning unit implemented such that:
the optical assembly can be positioned in a defined manner in relation to the at least first and/or second retroreflective reference target; and/or
the at least first and/or second retroreflective reference target can be positioned in a defined manner in relation to the optical assembly;
wherein the at least one further distance differs from a simulated distance.

7. The laser tracker as claimed in claim 6, wherein:
the optical assembly can be positioned in a defined manner comprising at least one of relatively offset, rotated in a defined manner, and linearly in parallel to the optical beam path.

8. The laser tracker as claimed in claim 6, wherein:
the at least first and/or second retroreflective reference target can be positioned offset linearly in parallel to the optical beam path.

9. The laser tracker as claimed in claim 6, wherein:
the simulated distance can be generated by means of offsetting the optical assembly and/or the at least first or second retroreflective reference target by means of the positioning unit such that the optical beam path extends through the optical assembly and is incident on the at least first retroreflective reference target; and/or
the at least one further distance can be generated by means of offsetting the optical assembly by means of the positioning unit out of the optical beam path such that the measurement radiation extends offset to the optical assembly; and/or
the at least one further distance can be generated by means of linear displacement of the at least first or second retroreflective reference target and/or the optical assembly in parallel to the optical beam path.

10. The laser tracker as claimed in claim 1, wherein:
the laser tracker has a control and analysis unit implemented such that a calibration functionality can be executed to determine the at least one calibration parameter, having:
an execution of a two-location measurement using the simulated distance and/or using the at least one further distance, wherein, in the scope of the two-location measurement, two measurements are executed in two locations at two different horizontal pivot angles and at two different vertical pivot angles and for each of the two measurements;
the measurement radiation is aligned by means of alignment of the beam deflection unit in relation to the base on the reference target, which provides the simulated distance and/or the at least one further distance, of the self-calibration unit;
the respective horizontal pivot angle and the respective vertical pivot angle are determined;
in each case the position of incidence of the measurement radiation, which is reflected on the respective reference target, on the photosensitive surface detector is determined;
a derivation of the at least one calibration parameter in dependence on the determined horizontal pivot angles, vertical pivot angles, and positions of incidence; and
wherein the two-location measurement represents the first calibration measurement.

11. The laser tracker as claimed in claim 10, wherein:
the control and analysis unit is implemented such that during execution of one two-location measurement in each case for the simulated distance and the at least one further distance in the scope of the calibration functionality;
the servo-monitoring point on the position-sensitive surface detector for regulating the alignment of the measurement radiation on the target in the scope of the target tracking;
the offset between the target axis defined by the structural implementation of the beam deflection unit and the emission axis defined by the emission of the measurement radiation;
the target axis error, which specifies the angle offset between the target axis and the emission axis; and
are determined as calibration parameters.

12. The laser tracker as claimed in claim 11, wherein the offset comprises a parallel offset.

13. The laser tracker as claimed in claim 10, wherein:
in the scope of the execution of the calibration functionality, by targeting at least the first retroreflective reference target by means of the optical assembly, an angle simulation at least in relation to the first retroreflective reference target can be caused such that a difference, which can be determined by the two-location measurement, of the horizontal pivot angle, vertical pivot angles, and the position of incidence is determined as if the at least first retroreflective reference target were at a greater distance than the actual distance of the reference target due to the structurally provided distance.

14. The laser tracker as claimed in claim 1, wherein:
the self-calibration unit has a beam guiding unit for defining the optical beam path and for guiding the measurement radiation to the at least first and/or second retroreflective reference target.

15. The laser tracker as claimed in claim 14, wherein:
the beam guiding unit is implemented such that the measurement radiation can be deflected by means of the beam guiding unit.

16. The laser tracker as claimed in claim 14, wherein:
the beam guiding unit comprises a mirror.

17. A calibration method for a laser tracker, the laser tracker comprising:
a beam source for generating measurement radiation;
a base, which defines a standing axis;
a support, which defines a tilt axis standing essentially orthogonally to the standing axis, wherein:
the support is pivotable by a motor in relation to the base about the standing axis;
a horizontal pivot angle is defined by an alignment of the support in relation to the base;
a beam deflection unit, which is pivotable by a motor about the tilt axis in relation to the support, wherein a vertical pivot angle is defined by an alignment of the beam deflection unit in relation to the support, wherein the beam deflection unit is configured for emitting and aligning the measurement radiation and for receiving at least a part of the measurement radiation reflected on a target; and
a photosensitive surface detector for detecting a position of incidence of the reflected measurement radiation on the surface detector and for generating an output signal for aligning the beam deflection unit for tracking the target;
wherein the method comprises:
executing at least one calibration measurement to at least one first retroreflective reference target;
determining the horizontal pivot angle, the vertical pivot angle, and the position of incidence of the measurement radiation, which is reflected on the at least first retroreflective reference target, on the photosensitive surface detector; and
deriving at least one calibration parameter with respect to a position and/or direction of the measurement radiation in dependence on the determined horizontal pivot angle, the determined vertical pivot angle, and the determined position of incidence;
wherein during the execution of the at least one calibration measurement, the at least first retroreflective reference target is targeted such that an optical beam path of the measurement radiation extends through a reducing optical assembly and the measurement radiation is incident on the at least first retroreflective reference target, so that the calibration measurement is performed using a distance which is simulated with respect to relevant measured variables for the determination of the at least one calibration parameter, wherein the simulated distance to the at least first retroreflective reference target is greater than an actually structurally provided distance to the at least first retroreflective reference target, wherein the relevant measured variables are represented by the horizontal pivot angle, the vertical pivot angle, and/or the position of incidence on the photosensitive surface detector.

18. The calibration method as claimed in claim 17, wherein:
at least one further distance is provided by targeting a second retroreflective reference target, and/or the at least one further distance is generated by an offset of the optical assembly in relation to the at least first and/or second retroreflective reference target.

19. The calibration method as claimed in claim 18, wherein:
at least one further simulated distance is provided by targeting a second retroreflective reference target, and/or the at least one further distance is generated by an offset of the optical assembly in relation to the at least first and/or second retroreflective reference target.

20. The calibration method as claimed in claim 18, wherein:
for the simulated distance and/or for the at least one further distance, at least two calibration measurements are executed at two different horizontal pivot angles and at two different vertical pivot angles and for each calibration measurement;
the measurement radiation is aligned by means of alignment of the beam deflection unit in relation to the base on the at least first and/or second retroreflective reference target;
the respective horizontal pivot angle and the respective vertical pivot angle are determined;
in each case the position of incidence on the photosensitive surface detector is determined; and
the at least one calibration parameter is derived in dependence on the horizontal pivot angles, the vertical pivot angles, and the positions of incidence, wherein:
a servo-monitoring point on the position-sensitive surface detector for regulating an alignment of the measurement radiation on the target;
an offset between a target axis defined by the structural implementation of the beam deflection unit and an emission axis defined by the emission of the measurement radiation;
a target axis error, which specifies an angle offset between the target axis and the emission axis; and
are determined as calibration parameters.

21. One or more non-transitory computer-readable media storing one or more programs that are configured, when executed, to cause one or more processors to execute the method comprising:
executing at least one calibration measurement to at least one first retroreflective reference target;
determining a horizontal pivot angle, a vertical pivot angle, and a position of incidence of measurement radiation, which is reflected on at least a first retroreflective reference target, on a photosensitive surface detector; and
deriving at least one calibration parameter with respect to a position and/or direction of the measurement radiation in dependence on the determined horizontal pivot angle, the determined vertical pivot angle, and the determined position of incidence;

wherein during the execution of the at least one calibration measurement, the at least first retroreflective reference target is targeted such that an optical beam path of the measurement radiation extends through a reducing optical assembly and the measurement radiation is incident on the at least first retroreflective reference target, so that the calibration measurement is performed using a distance which is simulated with respect to relevant measured variables for the determination of the at least one calibration parameter, wherein the simulated distance to the at least first retroreflective reference target is greater than an actually structurally provided distance to the at least first retroreflective reference target, wherein the relevant measured variables are represented by the horizontal pivot angle, the vertical pivot angle, and/or the position of incidence on the photosensitive surface detector.

* * * * *